United States Patent
Woo

(10) Patent No.: US 7,369,519 B2
(45) Date of Patent: May 6, 2008

(54) METHOD FOR DETERMINING THRESHOLD VALUE FOR ON/OFF CONTROLLING OUTPUT POWER OF MOBILE COMMUNICATION TERMINAL

(75) Inventor: Kyoung-Ho Woo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 959 days.

(21) Appl. No.: 10/788,205

(22) Filed: Feb. 27, 2004

(65) Prior Publication Data

US 2004/0184416 A1    Sep. 23, 2004

(30) Foreign Application Priority Data

Mar. 5, 2003   (KR) .................. 10-2003-0013722

(51) Int. Cl.
*G08C 17/00*   (2006.01)
(52) U.S. Cl. .............. 370/311; 455/522; 370/252; 370/332; 370/342; 370/329; 370/341; 370/318
(58) Field of Classification Search ............ 370/252, 370/332, 342, 311, 329, 341, 318; 455/522
See application file for complete search history.

(56) References Cited

U.S. PATENT DOCUMENTS 5,745,480 A * 4/1998 Behtash et al. ............ 370/252
6,108,364 A * 8/2000 Weaver et al. ............ 375/130
6,587,696 B1   7/2003 Ma et al. ................... 455/522
2003/0236089 A1* 12/2003 Beyme et al. ............. 455/423

FOREIGN PATENT DOCUMENTS

| EP | 1317078 A2 | 6/2003 |
| JP | 2002-198902 | 7/2002 |
| JP | 2003-209515 | 7/2003 |
| KR | 1020000066018 | 11/2000 |

* cited by examiner

*Primary Examiner*—Joseph Feild
*Assistant Examiner*—Shantell Heiber
(74) *Attorney, Agent, or Firm*—Ked & Associates, LLP

(57) ABSTRACT

A method for determining a threshold value for controlling output power of a mobile communication terminal in a W-CDMA system, includes: calculating a first value by dividing an average energy per a PN chip of downlink DPCCH by a total received power spectral density of downlink; calculating a second value by dividing the total received power spectral density of downlink by a white noise power spectral density; calculating a chip unit SIR by adding the first and second values; and determining a symbol unit threshold value for controlling ON/OFF of terminal output power by adding the chip unit SIR and a processing gain according to the number of chips per symbol. Accordingly, a symbol unit threshold value for controlling output power can be easily determined irrespective of a value of a data rate and a spreading factor.

22 Claims, 3 Drawing Sheets

UE SHUTS POWER OFF

UE TURNS POWER ON

| PARAMETER | UNIT | VALUE |
|---|---|---|
| $\hat{I}_{or}/I_{oc}$ | dB | −1 |
| $I_{oc}$ | dBm/3.84MHz | −60 |
| $\dfrac{DPDCH\_E_c}{I_{or}}$ | dB | SEE FIG 3 : BEFORE POINT A −16.6 AFTER POINT A NOT DEFINED |
| $\dfrac{DPCCH\_E_c}{I_{or}}$ | dB | SEE FIG 3 |
| INFORMATION DATA RATE | Kbps | 12.2 |

| BEARER(Kbps) | SLOT FORMAT | SF | PROCESSING GAIN[dB] |
|---|---|---|---|
| 12.2 | 8 | 128 | 21 |
| 32 | 12 | 64 | 18 |
| 64 | 13 | 32 | 15 |
| 128 | 14 | 16 | 12 |
| 384 | 16 | 4 | 0.6 |

METHOD FOR DETERMINING THRESHOLD VALUE FOR ON/OFF CONTROLLING OUTPUT POWER OF MOBILE COMMUNICATION TERMINAL

BACKGROUND OF THE INVENTION

1. Field of the Invention

The present invention generally relates to communication systems, and more particularly to a system and method for controlling a mobile terminal in a communication system when, for example, it includes W-CDMA (Wideband Code Division Multiple Access) systems.

2. Background of the Related Art

Generally, in a mobile communication system, a base station should receive the same level of wireless power output from a plurality of mobile terminals. This helps to maintain a channel capacity fixedly allocated to the base station.

When the output power of one of the terminals is higher, an adjacent mobile terminal regards the output power of the first mobile terminal as noise and thus increases its own output power in order to secure a stable signal-to-interference ratio (SIR).

In addition, if there is noise caused by a bad wireless link state, mobile terminals will raise their wireless transmission power or output power. Because the adjacent terminal also performs the same operation, the situation will develop where the plurality of mobile terminals will competitively raise their own output powers, and this will cause many problems. For example, the fixed channel capacity of the base station may be consumed, the channel capacity for communications may be reduced, the reliability of the system will deteriorate, and a load burden to the system will increase.

In order to solve such problems in the W-CDMA mobile communication system, first, each mobile terminal will monitor the state of a radio channel (that is, radio link) periodically. If the radio channel is not in good condition, the terminal shuts off its output power, and then when the radio channel gets back to good condition the terminal will turn its output power back on.

FIG. 1 illustrates a general W-CDMA system, which includes a user equipment (UE) 10 for providing mobile communications to a user, a base station 20 for serving as a wireless interface for the UE, and a switching center 30 connected by wire to the base station for switching a call.

The W-CDMA system operates as follows. When the UE, that is, a mobile communication terminal, pages an opposite party desired for communication while being moved within a service region formed by the base station, the wirelessly connected base station transmits a corresponding signal to the switching center. The switching center 30 then analyzes the received signal and sets a communication path through switching, and accordingly the mobile terminal 10 communicates with the desired party. The wireless communication path, that is, the radio channel, formed between the terminal and base station can transmit and receive video as well as voice and data.

FIG. 2 illustrates a downlink frame used in the W-CDMA system. The frame has a 10 ms period and includes a plurality of slots (slot#0~slot#15). One slot includes a first data field, a TPC (Transmit Power Control) field, a TFCI (Transmit format Combination Indicator) field, a second data field, and a pilot field. The first and second data fields constitute a data channel (that is, a DPDCH (Dedicated Physical Data Channel), and the TPC, TFCI, and pilot fields constitute a control channel (that is, a DPCCH (Dedicated Physical Control Channel).

Each slot has 2560 chips. The TPC field is used for designating an output power control function. The TFCI field indicates a construction of a frame format. And, pilot field provides information for measuring a quality of the DPCCH to obtain frame synchronization and control ON/OFF of output power of the mobile communication terminal.

Generally, in the W-CDMA system, in order to decode a current radio channel, a mobile terminal needs to obtain synchronization of the radio channel. In addition, the mobile terminal must periodically report a synchronization state of the radio channel or a quality of the radio channel to an upper layer. In determining the frame synchronization state using a pilot channel (pilot field), the mobile terminal uses quality measurement of a CRC (Cyclic Redundancy Check) and DPCCH. The mobile communication terminal especially performs the frame synchronization by using the pilot channel (pilot field) of the DPCCH.

Also, in the W-CDMA system, ON/OFF of output power is controlled according to a quality of the DPCCH, and in this case two threshold values are set to control ON/OFF of output power of the mobile terminal. The first threshold value is used for turning OFF output power and the second threshold value is used for turning ON output power.

A W-CDMA system standard known as 3GPP TS 25.101 proposes to use the two threshold values to determine a quality of the control channel as follows: the first threshold value ($Q_{out}$) is to be set with a 30% downlink TPC command error ratio level and the second threshold value ($Q_{in}$) is to be set with a 20% downlink TPC command error ratio level. This standard, however, only proposes conditions for determining threshold values for controlling ON/OFF of output power of a mobile communication terminal, does not mention a method for determining the threshold values themselves. A need therefore exists for a method of determining the threshold values for controlling ON/OFF of output power of a mobile terminal in a W-CDMA system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for determining a threshold value of a downlink control channel quality to determine a synchronization state of a downlink radio channel in a W-CDMA system.

To achieve at least the above objects in whole or in parts, there is provided a method for determining a threshold value for controlling ON/OFF of output power of a mobile communication terminal in a W-CDMA system, including: calculating a first value by dividing an average energy per PN chip of downlink DPCCH by a total received power spectral density of downlink; calculating a second value by dividing the total received power spectral density of downlink by a white noise power spectral density; calculating a chip unit SIR by adding the first and second values; and determining a symbol unit threshold value for controlling ON/OFF of terminal output power by adding the chip unit SIR and a processing gain according to the number of chips per symbol.

Two chip unit SIRs having a hysterisis are calculated to prevent a ping-pong phenomenon, and the symbol unit threshold value is generated for each chip unit SIR. The symbol unit threshold value has the same value regardless of a service type and an spreading factor (SF) of the downlink DPCCH.

If a data rate is 12.2 Kbps and the SF is 128, in order to control OFF of output power of the mobile communication terminal, the first value is set to −25 dB and the second value is set to −1 dB.

The step of adding the processing again includes: calculating the processing gain by using the SF; and adding the chip unit SIR and the calculated processing gain. The processing gain can be obtained by using $10 \log_{10} (SF)$, and the symbol unit threshold value is −5 dB and has the same value regardless of the service type of the downlink DPCCH and the SF.

If the data rate is 12.2 Kbps and the SF is 128, in order to control ON of output power of the mobile communication terminal, the first value is set to −21 dB and the second value is set to −1 dB.

The processing gain can be obtained by using $10 \log_{10}$ (SF), and the symbol unit threshold value is −1 dB and has the same value regardless of the service type of the downlink DPCCH and the SF.

In accordance with another embodiment, a method for determining a threshold value for controlling ON/OFF of output power of a mobile communication terminal in a W-CDMA system includes adding a ratio of an average energy per PN chip of downlink DPCCH to a total output power spectral density of downlink measured in a mobile communication terminal and a ratio of the total output power spectral density to a limited band white noise power spectral density, in order to calculate a chip unit SIR, using a chip unit threshold value proposed in a test case of 3GPP TS 24.101 standard as the ratio of the average energy per PN chip of downlink DPCCH to the measured total output power spectral density of downlink, setting the ratio of the total output power spectral density to the limited band white noise power spectral density as −1 dB proposed in the test case, calculating the chip unit SIR by adding −1 dB to the chip unit threshold value, and calculating a symbol unit SIR by adding a processing gain according to the number of chips per symbol to the chip unit SIR and determining the symbol unit SIR as a threshold value for controlling output power of the mobile communication terminal.

As for the chip unit threshold value proposed in the test case, if a threshold value for OFF-controlling output power of the mobile communication terminal is calculated, a value −25 dB is used, whereas if a threshold value for ON-controlling output power of the mobile communication terminal is calculated, a value −21 dB is used. As the processing gain, a value 21 is used.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
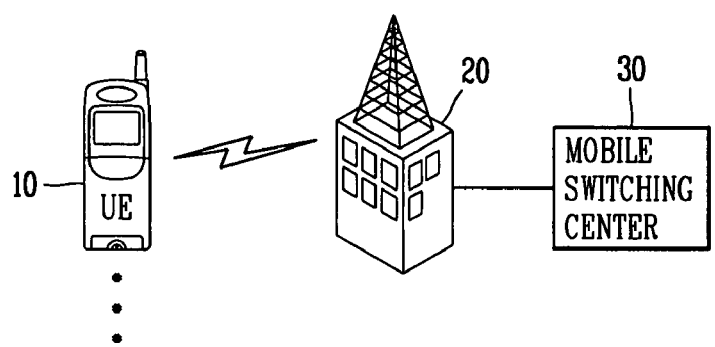
FIG. 1 illustrates a structure of a W-CDMA system.
Figure 2:
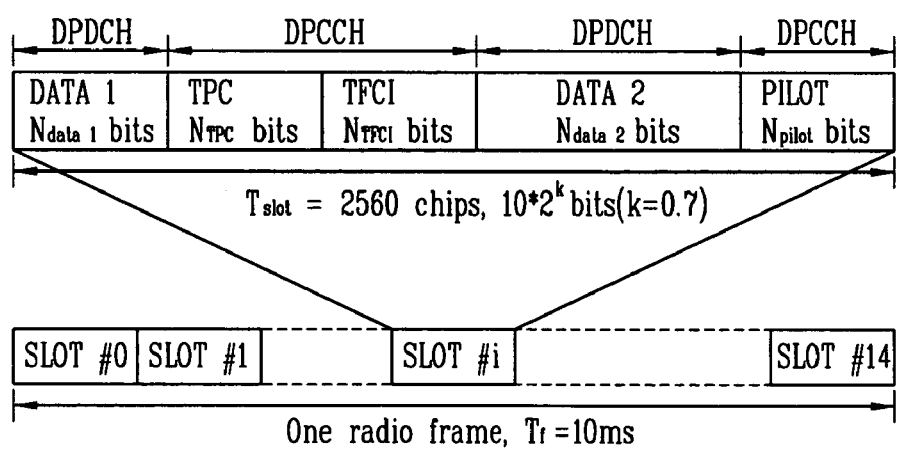
FIG. 2 illustrates a structure of a downlink frame used in the W-CDMA system of FIG. 1.
Figures 3, 4:
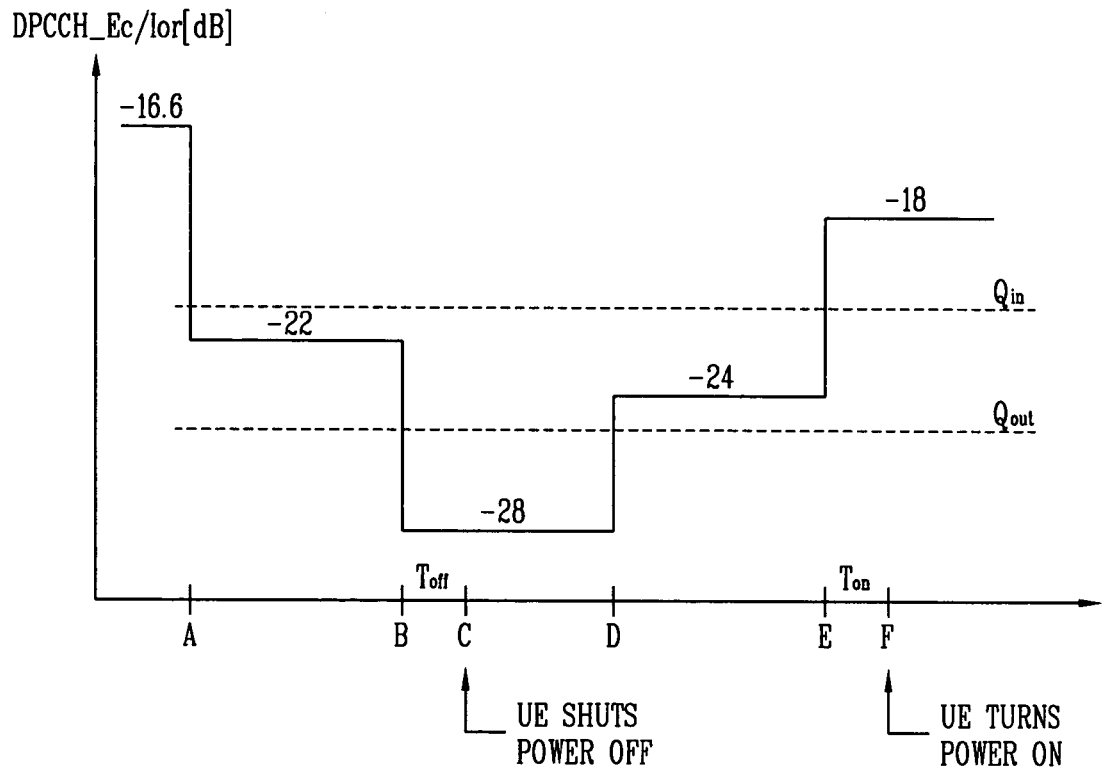
FIG. 3 is a graph showing a method for ON/OFF controlling output power of a mobile communication terminal in the W-CDMA system.
FIG. 4 illustrates parameters of a 3GPP TS 25.101 standard of the W-CDMA system for determining an asynchronous state.

FIG. 3 is a graph showing a method for ON/OFF controlling output power of a mobile communication terminal. In a W-CDMA system, two threshold values are set for ON/OFF control of output power of a mobile communication terminal.

An example is taken in which a first threshold value ($Q_{out}$) for OFF control of output power is set to −25 dB and a second threshold value ($Q_{in}$) for ON control of output power is set to −21 dB. At point A, although a quality of the DPCCH, that is, a quality of the pilot channel, has degraded from −16 dB to −22 dB, if the quality of the DPCCH is greater than the first threshold value, the mobile terminal generates output power of a wireless transmitter.

At point B, the quality of the DPCCH is not greater than the first threshold value. The mobile communication terminal therefore monitors whether the quality of the DPCCH is maintained below the first threshold value during a predetermined period of time $T_{off}$ (e.g., during 160 ms) after starting from the point B. If the quality of the DPCCH stays below the first threshold value for this period measured from point B, the mobile terminal determines that frame synchronization has not been obtained and turns off output power of the wireless transmitter. If, however, the quality of the DPCCH is not maintained below the first threshold value for the period measured from point B, the mobile terminal does not turn off the output power of the wireless transmitter. Thereafter, the mobile terminal keeps monitoring the quality of the DPCCH received through a wireless receiver.

At point D, the mobile terminal compares the quality of the DPCCH with the second threshold value. If the quality of the DPCCH having a value −24 dB is smaller than the second threshold value, the mobile terminal determines that frame synchronization has not been obtained and maintains the output power of the wireless transmitter in the OFF state.

At point E, if the quality of the DPCCH is not smaller than the second threshold value, the mobile terminal monitors whether the quality of the DPCCH is maintained above the second threshold value during a predetermined period of time $T_{on}$ after starting from point E. If the quality of the DPCCH stays above the second threshold value for the period $T_{on}$ measured from point E, the terminal switches on the output power of the wireless transmitter.

The reason for setting two threshold values, each having a different value, in ON/OFF controlling the output power of the mobile communication terminal is to prevent a ping-pong phenomenon and ensure a stable operation by setting a hysterisis.

If a radio channel environment is not suitable for communication between the base station and a mobile terminal, the output power of the terminal is cut off. This prevents an adjacent mobile terminal from continuously increasing its signal-to-interference ratio, since if the power were not turned off the adjacent terminal would perceive the output power of the first terminal as noise and would therefore increase its on power. Turning off the power of the first terminal thus prevents unnecessary power consumption by adjacent terminals.

The present invention proposes a method for easily determining the threshold values for determining cut-off of the output power of a mobile communication terminal. As mentioned above, the 3GPP TS 25.101 standard of the W-CDMA system has proposed the test case for determining an asynchronous state when the data rate is 12.2 Kbps.

FIG. 4 illustrates parameters for a 3GPP TS 25.101 standard of the W-CDMA system for determining an asynchronous state.

As shown in FIG. 4, if the data rate is 12.2 Kbps, $$\frac{\hat{I}_{or}}{I_{oc}}$$

has a value −1 dB, $$\frac{DPDCH\_E_c}{I_{or}}$$

has a value −16.6 dB before point A, and no value has been defined after point A (refer to FIG. 3).

In $$\frac{\hat{I}_{or}}{I_{oc}},$$

$\hat{I}_{or}$ is a received power spectral density of downlink measured in an antenna of a mobile communication terminal and $I_{oc}$ is a power spectral density of white noise of a limited band measured in the antenna of the mobile communication terminal.

$$\frac{DPDCH\_E_c}{I_{or}}$$

is a ratio of an average energy per PN chip of the DPDCH (Dedicated Physical Data Channel) to the total output power spectral density of downlink measured in an antenna of a base station, in which DPDCH_E$_c$ indicates an average energy per PN chip of the DPDCH and $I_{or}$ indicates a total output power spectral density of downlink measured in the antenna of the base station.

$$\frac{DPCCH\_E_c}{I_{or}}$$

is a ratio of an average energy per PN chip of DPCCH to the total output power spectral density of downlink measured in the antenna of the base station, in which DPCCH_E$_c$ indicates the average energy per PN chip of DPCCH measured in the antenna of the base station.

In the 3GPP TS 24.101 standard, when the data rate is 12.2 Kbps, the threshold value ($Q_{out}$) for turning off the output power of the mobile communication terminal is proposed as $$\frac{DPCCH\_E_c}{I_{or}}$$

having 25 dB and the threshold value ($Q_{in}$) for turning on the output power is proposed as $$\frac{DPCCH\_E_c}{I_{or}}$$

having −21 dB.

Using the data rate (=12.2 Kbps) and the chip unit values $Q_{out}$[DPCCH_E$_c$/I$_{or}$]=−25 dB and $Q_{in}$[DPCCH_E$_c$/I$_{or}$]=−21 dB as proposed in the standard, the present invention proposes a method for easily calculating the first and the second threshold values to be applied to the mobile communication terminal. (Herein, the first threshold value is for OFF-controlling the output power of the mobile communication terminal and the second threshold value is for ON-controlling the output power of the mobile communication terminal.) In addition to the case of the data rate of 12.2 Kbps proposed as the test case in the above standard, the present invention also proposes a method for easily determining the first and second threshold values that can be applied to every data rate possible.

Figures 5, 6:
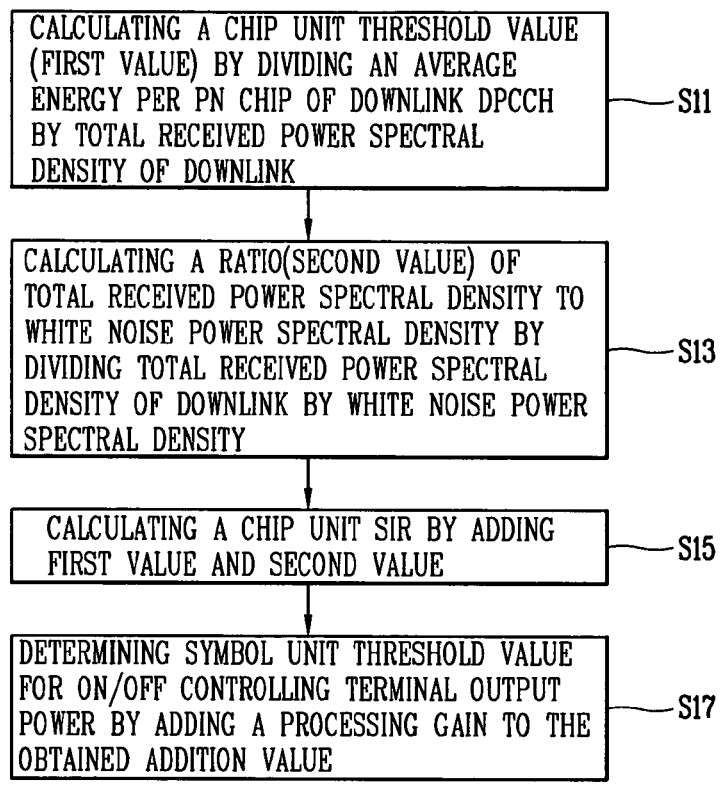
FIG. 5 is a flow chart of a method for determining a threshold value for ON/OFF controlling output power of a mobile communication terminal in a W-CDMA system.
FIG. 6 illustrates processing gains obtained according to spreading factors of each channel bearer.

FIG. 5 is a flow chart showing steps included in a method for determining a threshold value for ON/OFF controlling output power of a mobile communication terminal in a W-CDMA system.

The method initially includes calculating a chip unit threshold value (a first value) by dividing an average energy per PN chip of downlink DPCCH by a total received power spectral density of downlink (step S11). This is followed by calculating a ratio (a second value) of a total received power spectral density to a white noise power spectral density by dividing the total received power spectral density of downlink by the white noise power spectral density (step S13). A chip unit SIR is then calculated by adding the first value and the second value (step S15), and a symbol unit threshold value is determined for ON/OFF controlling output power of the terminal by adding the chip unit SIR and a processing gain according to the number of chips per symbol.

The first value may be set as the chip unit threshold values ($Q_{in}$ and $Q_{out}$) proposed in the test case in the 3GPP TS 25.101 standard, and the second value may be set as −1 dB proposed in the standard. While these values are preferable, other values may also be used in implementing the method of the present invention.

The threshold value for ON/OFF controlling output power of the terminal indicates a value measured by the unit of symbol.

The first value can be expressed as $$\frac{DPC\hat{C}H\_E_c}{\hat{I}_{or}}, \text{ where } \frac{DPC\hat{C}H\_E_c}{\hat{I}_{or}}$$

indicates a ratio of the average energy per PN chip of the downlink DPCCH to the total received power spectral density of downlink measured in the mobile communication terminal. Also, $\hat{I}_{or}$ or indicates a total output power spectral density of downlink measured in the mobile terminal and $DPC\hat{C}H\_E_c$ indicates the average energy per PN chip of DPCCH received by the terminal.

First, the mobile terminal determines that the value $$\frac{DPC\hat{C}H\_E_c}{\hat{I}_{or}}$$

is identical to a value $$\frac{DPCCH\_E_c}{I_{or}}$$

in the base station as in Equation (1):

$$\frac{DPC\hat{C}H\_E_c}{\hat{I}_{or}}[dB] = \frac{DPCCH\_E_c}{I_{or}}[dB] \quad (1)$$

If the data rate is 12.2 Kbps and $$\frac{DPCCH\_E_c}{I_{or}} = Q \ [dB],$$

the chip unit SIR of the downlink DPCCH, that is, $SIR_c[dB]$ can be expressed by Equation (2):

$$SIR_c \ [dB] = \frac{DPC\hat{C}H\_E_c}{I_{oc}} = \frac{DPC\hat{C}H\_E_c}{\hat{I}_{or}} + \frac{\hat{I}_{or}}{I_{oc}} = Q + \frac{\hat{I}_{or}}{I_{oc}} = Q-1 \quad (2)$$

Namely, by using the property that the value $$\frac{DPC\hat{C}H\_E_c}{I_{oc}}$$

is not changed although $\hat{I}_{or}$ is multiplied to both the denominator and the numerator of $$\frac{DPC\hat{C}H\_E_c}{I_{oc}},$$

the mobile communication terminal changes $$\frac{DPC\hat{C}H\_E_c}{I_{oc}} \text{ to } \frac{DPC\hat{C}H\_E_c}{\hat{I}_{or}} + \frac{\hat{I}_{or}}{I_{oc}}$$

on a logarithm domain.

The second value, that is, $$\frac{\hat{I}_{or}}{I_{oc}},$$

may have a value −1 dB as shown in FIG. 4.

Accordingly, the mobile communication terminal simply sets the $Sir_c[dB]$ of the downlink DPCCH as Q−1 using Equation (1).

More specifically, Equation (2) indicates an SIR when the mobile terminal traces only one signal (one path) transmitted from the base station in the wireless environment, without considering multipath influences. When multipath influence is taken into consideration, there can be a difference of 1+α [dB] between 'Q' and SIR. (For reference, $$\frac{\hat{I}_{or}}{I_{oc}} = -1 \ dB$$

can be considered as an influence of an adjacent cell).

Accordingly, the current one path environment is considered to be in the worst state. The reason is because, at the side of the mobile communication terminal, the quality of the DPCCH is quite better than the quality of the DPCCH in the one-path environment thanks to the diversity effect by the multipath.

Meanwhile, the downlink data rate differs depending on what kind of service is provided, and as the data rate differs a slot format is changed accordingly.

FIG. 6 illustrates processing gains which may be obtained according to spreading factors of each channel bearer. When a service, that is, a channel bearer, is 12.2 Kbps, the slot format is 8 and the SF is 128. The SF indicates the number of chips per symbol, data to be actually transmitted. For example, when the slot format is 8, 128 chips are to be used to decode one symbol (SF=128), and the processing gain is 21 dB. Herein, since the processing gain is $10*\log_{10}(SF)$, $10*\log_{10}(128)=21$ [dB].

The 3GPP TS 25.101 standard proposes $Q_{out}=-25$ dB and $Q_{in}=-21$ dB when the data rate is 12.2 Kbps in the test case, so that when the mobile communication terminal applies $Q_{out}=-25$ dB and $Q_{in}=-21$ dB to Equation (2), $SIR_{c-out}=Q_{out}-1=-26$ dB, $SIR_{c-in}=Q_{in}-1=-22$ dB when the data rate is 12.2 Kbps.

In this case, since $Q_{out}$ and $Q_{in}$ proposed in the standard are expressed in the unit of $E_c/I_{or}$, the thusly calculated $SIR_{c-out}$ and $SIR_{c-in}$ are also expressed in the unit of $E_c/I_{or}$.

Being the ratio of the output energy per chip to total output power spectral density, the value $E_c/I_{or}$ differs depending on the SF value. Accordingly, if the data rate is 12.2 Kbps, the SF is 128, $Q_{out}$ is −25 dB and $Q_{in}$ is −21 dB, then, $$SIR_{c-out}\left(\frac{E_c}{I_{or\;out}}\right)$$

is −26 dB and $$SIR_{c-in}\left(\frac{E_c}{I_{or\;in}}\right)$$

is −22 dB. If SF changes, $$SIR_{c-out}\left(\frac{E_c}{I_{or\;out}}\right) \text{ and } SIR_{c-in}\left(\frac{E_c}{I_{or\;in}}\right)$$

are also changed.

Thus, the SIR, which is not changed over SF, will be referred to as a symbol unit SIR. The mobile communication terminal obtains the symbol unit SIR by adding the processing gain to the chip unit SIR.

The mobile communication calculates the symbol unit SIR of the downlink DPCCH, that is, $SIR_s[dB]$, as expressed in Equation (3):

$$SIR_s[dB] = \frac{DPC\hat{C}H\_E_c}{I_{oc}} + \text{processing gain} \quad (3)$$

$$= \frac{DPC\hat{C}H\_E_c}{\hat{I}_{or}} + \frac{\hat{I}_{or}}{I_{oc}} + \text{processing gain}$$

$$= Q + \frac{\hat{I}_{or}}{I_{oc}} + \text{processing gain}$$

$$= Q - 1 + \text{processing gain}$$

Namely, the mobile terminal calculates the $SIR_s$, the symbol unit SIR, by adding the processing gain to $$\frac{DPC\hat{C}H\_E_c}{I_{oc}}$$

(step S17). Herein, the mobile terminal replaces $$\frac{DPC\hat{C}H\_E_c}{I_{oc}}$$

with Q−1 with reference to Equation (2) (steps S11-S15).

Accordingly, the mobile terminal calculates $$\frac{DPCCH\_E_b}{I_{or\;out}},$$

the first threshold value (the symbol unit SIR) for OFF-controlling output power as expressed in Equation (4) (S11-S17):

$$\frac{DPCCH\_E_b}{I_{or\;out}} = Q_{out} - 1 + \text{processing gain} \quad (4)$$

$$= -25 - 1 + 21$$

$$= -5$$

Since the 3GPP TS 25.101 standard proposes $Q_{out}$, the chip unit value, as −25 dB when the data rate is 12.2 Kbps, the mobile terminal sets $Q_{out}$ as −25 dB. In addition, the mobile terminal sets the processing gain as 21 dB (refer to FIG. 6).

Accordingly, the mobile terminal determines $$\frac{DPCCH\_E_b}{I_{or\;out}}$$

as −1 dB. In this case, since $$\frac{DPCCH\_E_b}{I_{or\;out}}$$

is the symbol unit SIR, it is not changed over the SF.

In addition, the mobile terminal calculates $$\frac{DPCCH\_E_b}{I_{or\;in}},$$

the second threshold value (symbol unit SIR) for ON-controlling output power as expressed in Equation (5) (steps S11-S17):

$$\frac{DPCCH\_E_b}{I_{or\;in}} = Q_{in} - 1 + \text{processing gain} \quad (5)$$

$$= -21 - 1 + 21 = -1$$

Since the 3GPP TS 25.101 standard proposes $Q_{in}$, the chip unit value, as −21 dB when the data rate is 12.2 Kbps, the mobile terminal sets $Q_{in}$ as −21 dB. In addition, the terminal sets the processing gain as 21 dB (refer to FIG. 6).

Accordingly, the mobile terminal determines $$\frac{DPCCH\_E_b}{I_{or}}\bigg|_{in}$$

as −1 dB. In this case, since $$\frac{DPCCH\_E_b}{I_{or}}\bigg|_{in}$$

is the symbol unit SIR, it is not changed over the SF.

The thusly obtained $$\frac{DPCCH\_E_b}{I_{or}}\bigg|_{out} (-5\ dB),\ \frac{DPCCH\_E_b}{I_{or}}\bigg|_{in} (-1\ dB)$$

can not only be used as threshold values for ON/OFF control of the output power of the mobile communication terminal when the data rate is 12.2 Kbps, the SF is 128 and the processing gain is 21, but also may be applied to a case with a different data rate.

As so far described, the method for determining a threshold value for ON/OFF controlling output power of a mobile communication terminal has at least the following advantages.

By determining the first threshold value for OFF-controlling output power of the mobile terminal and the second threshold value for ON-controlling output power of the mobile terminal using the chip unit threshold value proposed in the 3GPP TS 25.101 standard and a corresponding processing gain, the first and second threshold values can be easily determined.

In addition, because the first and second threshold values are set having the symbol unit SIR value, the present invention can be applied regardless of a type of the service (type of data rate) of downlink radio channel.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for ON/OFF-controlling output power of a mobile communication terminal, comprising:
    calculating a first value by dividing an average energy per PN chip of a downlink channel (DPCCH) by a total received downlink power spectral density;
    calculating a second value by dividing the total received downlink power spectral density by a white noise power spectral density;
    calculating a chip unit SIR by adding the first and second values; and
    determining a symbol unit threshold value for controlling ON/OFF of an output power of the terminal by adding the chip unit SIR and a processing gain according to a number of chips per symbol.

2. The method of claim 1, wherein two chip unit SIRs having a hysterisis are calculated to prevent a ping-pong phenomenon, and the symbol unit threshold value is generated for each chip unit SIR.

3. The method of claim 2, wherein the symbol unit threshold value has the same value regardless of a service type and an SF (Spreading Factor) of the downlink channel.

4. The method of claim 1, wherein the first value is set to −25 dB and the second value is set to −1 dB, in order to control turning OFF of output power of the mobile terminal when a data rate is 12.2 Kbps and a spreading factor (SF) is 128.

5. The method of claim 2, wherein at least one of the first value and the second value is set based on a communications standard, in order to control turning OFF of output power of the mobile terminal.

6. The method of claim 5, wherein the standard is a 3GPP TS 25.101 test case.

7. The method of claim 4, wherein adding the processing gain comprises:
    calculating the processing gain using the SF; and
    adding the chip unit SIR and the calculated processing gain.

8. The method of claim 7, wherein the processing gain can be obtained by using $10\ \log_{10}(SF)$.

9. The method of claim 8, wherein the symbol unit threshold value is −5 dB.

10. The method of claim 9, wherein the symbol unit threshold value has the same value regardless of service type and the SF of the downlink channel.

11. The method of claim 1, wherein the first value is set to −21 dB and the second value is set to −1 dB, in order to control turning ON the output power of the mobile terminal when the data rate is 12.2 Kbps and a spreading factor (SF) is 128.

12. The method of claim 11, wherein adding the processing gain comprises:
    calculating the processing gain using the SF; and
    adding the chip unit SIR and the calculated processing gain.

13. The method of claim 12, wherein the processing gain is obtained using $10\ \log_{10}(SF)$.

14. The method of claim 13, wherein the symbol unit threshold value is −1 dB.

15. The method of claim 14, wherein the symbol unit threshold value has the same value regardless of service type and the SF of the downlink channel.

16. The method of claim 15, wherein the predetermined chip unit threshold value is set as −25 dB for OFF-controlling output power of the mobile terminal, and the predetermined chip unit threshold value is set as −21 dB for ON-controlling output power of the mobile terminal.

17. The method of claim 16, wherein the processing gain is set as 21.

18. A method for controlling output power of a mobile communication terminal, comprising:
    adding a ratio of an average energy per PN chip of a downlink channel to a total downlink output power spectral density measured in the mobile terminal and a ratio of the total downlink output power spectral density to a limited band white noise power spectral density, in order to calculate a chip unit SIR;
    using a predetermined chip unit threshold value for the ratio of the average energy per PN chip of downlink channel to the measured total downlink output power spectral density;

setting the ratio of the total downlink output power spectral density to the limited band white noise power spectral density to a prescribed value;

calculating the chip unit SIR by adding the prescribed value to the predetermined chip unit threshold value; and calculating a symbol unit SIR by adding a processing gain according to a number of chips per symbol to the chip unit SIR and determining the symbol unit SIR as a threshold value for controlling output power of the mobile communication terminal.

19. The method of claim 18, wherein the predetermined chip unit threshold value is determined by a communications protocol.

20. The method of claim 19, wherein the communications protocol is a W-CDMA protocol.

21. The method of claim 20, wherein the W-CDMA protocol is a test case of a 3GPP TS 24.101 standard.

22. The method of claim 18, wherein the prescribed value is −1 dB.

* * * * *